June 11, 1968   G. DE COYE DE CASTELET   3,387,549
AIR-CONDITIONING DEVICES FOR VEHICLES
Filed Oct. 3, 1966
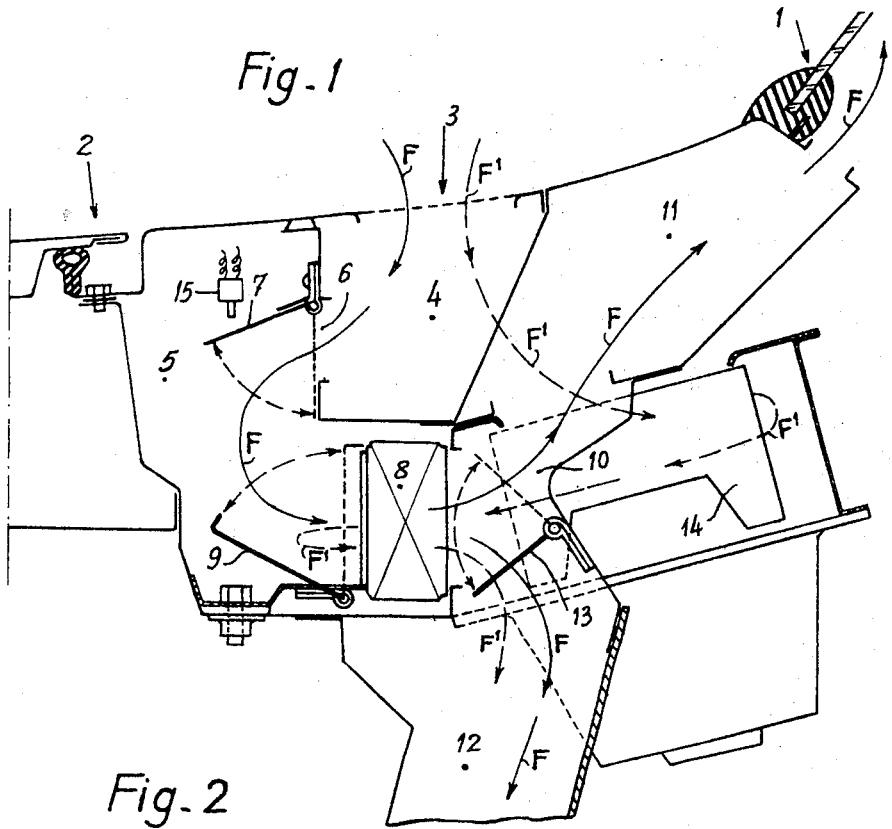
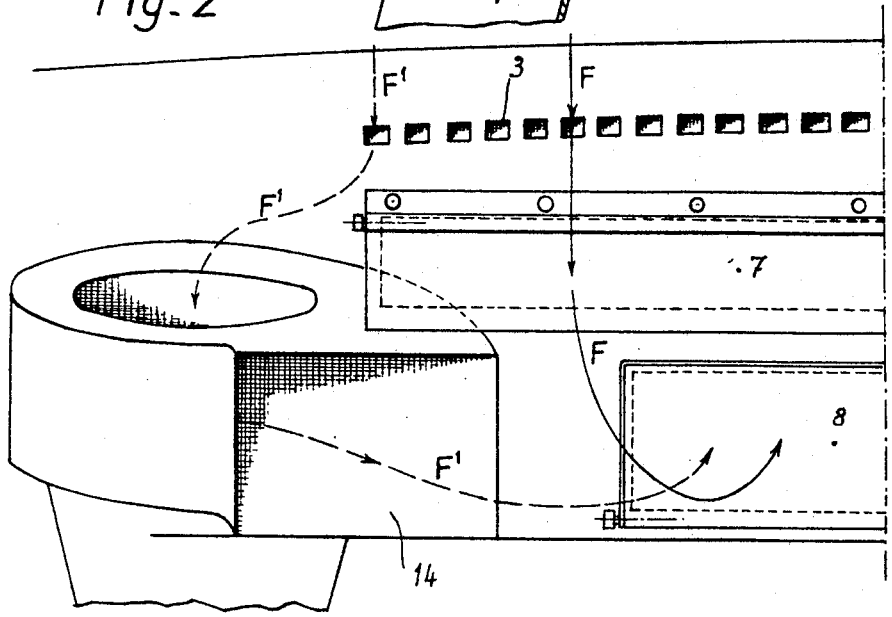

United States Patent Office 3,387,549
Patented June 11, 1968

3,387,549
AIR-CONDITIONING DEVICES FOR VEHICLES
Gaëtan de Coye de Castelet, Billancourt, France, assignor to Regie Nationale des Usines, Renault, Billancourt, France
Filed Oct. 3, 1966, Ser. No. 583,573
Claims priority, application France, Oct. 21, 1965, 35,709, Patent 1,460,868
2 Claims. (Cl. 98—2)

ABSTRACT OF THE DISCLOSURE

An air conditioning device for a vehicle having an air intake for feeding fresh air into a feed chamber and means to distribute air from the feed chamber into the passenger compartment of the vehicle. The device includes two fresh air paths one of which flows by dynamic pressures and the other of which flows by the operation of fan means.

---

This invention relates to an air-conditioning device for vehicle.

In most air-conditioning systems, notably of the type described and illustrated in the U.S. Patent application No. 400,787 filed by the same applicant on Oct. 1, 1964, now Patent 3,289,564, issued Dec. 6, 1966, heating air can be directed through the air heater and then into the passengers' compartment of the vehicle by two means, namely:

(1) Either by the fan of the heating system which draws air from the outside through apertures provided to this end in the vehicle body and subsequently directs it through the air heater proper and then into the passengers' compartment;

(2) Or by relying on the dynamic air pressure produced by the forward motion of the vehicle but only above a predetermined vehicle speed. In this case, the outside air is generally admitted through the same aperture of the vehicle body as in the preceding case, and caused to flow through the fan before passing through the heater and into the passengers' compartment.

In this last instance, it would be advantageous, in order to obtain a good efficiency, to have on the one hand a relatively large-sized air intake located in a zone of high dynamic pressure so as to draw a sheet of air, and on the other hand to prevent this air from being retarded by flowing through the fan which in this case is inoperative.

Most drivers utilize their air-conditioning systems in this last-mentioned manner and prefer not to start their fan (which is frequently noisy in operation), unless they simply forget to use it. Therefore, it is the essential object of this invention to provide improvements in the construction of air-conditioning devices of vehicles, with a view to improve the efficiency of these devices under dynamic pressure operating conditions, without however reducing their efficiency when the fan is operated.

According to the arrangement constituting the subject-matter of this invention, the air flowing through the heating fan and the air used under dynamic pressure conditions are separated as follows:

Under dynamic pressure operating conditions the air entering through an air intake extending approximately throughout the width of the vehicle is directed into a first chamber from which any rain- or wash-water is decanted, and subsequently flows into a second chamber through a shutter-controlled aperture; from this second chamber the air stream is directed through the air heater equipped with another shutter for regulating the air input, the air stream being finally divided at the outlet end of the heater into two fractions for heating the passengers' compartment and for demisting, defrosting or ventilation purposes.

If the fan is used, the air entering the first expansion chamber is drawn by the centrifugal fan disposed laterally thereto. This fan blows the air directly into the second chamber and the pressure created therein by the air blown by the fan closes the shutter controlling the dynamic air flow, whereafter the air stream flows through the heater and is divided as set forth hereinabove.

If the fan is switched on and if, when driving, the dynamic pressure prevailing in the first chamber becomes higher than the air pressure resulting from the fan operation and prevailing in the second chamber, the shutter of the first chamber will be opened by this higher pressure and thus the highest pressure is always available for air-conditioning purposes.

In the attached drawing a typical air-conditioning system according to this invention is illustrated diagrammatically by way of example. In the drawing:

FIGURE 1 is a diagrammatic, part-sectional and part-elevational lateral view of the front portion of a vehicle equipped with the various component elements of the improved device of this invention, and FIGURE 2 is a fragmentary front elevational view of the air-conditioning device.

Referring to the drawing, the front portion of the vehicle body which extends from the windshield 1 to the hood 2 at the front thereof comprises air inlet apertures 3 protected by a grille overlying a first chamber 4. Adjacent this chamber 4 is a larger chamber 5 communicating with the former through an aperture 6 controlled by a free-hinged shutter 7. This chamber 5 has mounted therein the air-heater or like device 8 of relatively great length disposed horizontally across the vehicle frame, the ingress of air to this heater being controlled by another hinged shutter 9 mounted adjacent the heater and adapted to be actuated through any suitable means and also to close the heater inlet aperture completely, if desired.

The air stream having passed through the heater 8 flows into another chamber 10 having its upper portion connected to a duct 11 leading to the demisting and ventilation outlets and its lower portion connected to a heating duct 12 proper opening into the passengers' compartment of the vehicle, for example near the floor thereof.

The first and second chambers 4 and 5 are provided with the conventional drip channels for draining off any residual rain- or wash-water.

The air stream issuing from the heater 8 and entering the innermost chamber 10 is directed into ducts 11 and 12 by means of a shutter 13 mounted in this chamber 10 and controlled through any suitable means. The air necessary for heating and/or demisting purposes may also be fed to the device in a different manner. Thus, a centrifugal fan 14 disposed laterally as shown in FIGURE 2 draws air through the inlet grille 3 into chamber 4 and blows it directly into chamber 5; this air subsequently flows through the heater 8 and is distributed as already explained hereinabove among ducts 11 and 12.

The air-conditioning system operates as follows:

In the case of a dynamic air path, the incoming air penetrates into the running vehicle through the inlet grille 3, that is, nearly throughout the width of the vehicle, and flows into the first chamber 4 and then into chamber 5 by raising the shutter 7; this air subsequently flows through the heater 8 and is finally distributed among ducts 11 and 12. In this case the air path is shown by the arrows F.

If the fan 14 is used, the latter blows the air directly into chamber 5 and the pressure created therein by the air blown by the fan tends to close the shutter 7 controlling the dynamic air flow; the air blown by the fan will thus flow through the heater 8 and is finally distributed as in the preceding case. The air drawn by the fan follows the path shown by the arrows $F^1$.

During the fan operation and if when driving the pressure prevailing in the first chamber 4 becomes higher than the air pressure obtaining at the fan outlet and therefore in the second chamber 5, the shutter 7 associated with the first chamber is open by this higher pressure and thus the highest pressure is always available for air-conditioning purposes.

In this case the fan operation is not required and the fan motor may be stopped. On the other hand, the fan energizing circuit may be switched off automatically by inserting in series with the conventional fan control switch a contact 15 (diagrammatically indicated by a block) responsive to the movement of shutter 7 so as to open the fan energizing circuit when for a given degree of opening of this shutter 7.

Although the present invention has been described in conjunction with a preferred embodiment, it is to be understood that modifications and variations may be resorted to without departing from the spirit and scope of the invention as those skilled in the art will readily understand. Such modifications and variations are considered to be within the purview and scope of the invention and appended claims.

What is claimed is:
1. An air conditioning device for vehicles comprising a fresh air feed chamber, an air inlet means open to ambient air, first and second means providing communication between said air inlet means and said fresh air feed chamber, said first means comprising front chamber means having an inlet aperture leading to said air inlet means and an outlet leading to said fresh air feed chamber, shutter means mounted to normally close said aperture and to open in response to the air pressure at said air inlet being greater than the air pressure in said fresh air feed chamber, said second means comprising duct means and fan means mounted in said duct means to blow air into said fresh air feed chamber, heater means mounted in said fresh air feed chamber and duct means connecting said fresh air feed chamber to the passenger compartment of said vehicle.

2. An air conditioning device for vehicles according to claim 1 further comprising a fan energizing circuit having switching means responsive to the angle of said shutter whereby when the angle of said shutter with respect to said aperture exceeds a predetermined value, said fan will be cut off.

References Cited
UNITED STATES PATENTS

| | | | |
|---|---|---|---|
| 2,146,845 | 2/1939 | Payne | 98—2.4 XR |
| 2,235,642 | 3/1941 | Lintern | 98—2.4 XR |
| 2,295,750 | 9/1942 | Norris | 98—2.4 XR |
| 2,510,790 | 6/1950 | Arnold | 98—2.4 XR |
| 2,738,718 | 3/1956 | Reynolds | 98—2.4 XR |

MEYER PERLIN, *Primary Examiner.*